United States Patent
Stringham

(10) Patent No.: US 10,769,110 B2
(45) Date of Patent: Sep. 8, 2020

(54) FACILITATING QUERIES FOR INTERACTION DATA WITH VISITOR-INDEXED DATA OBJECTS

(71) Applicant: Adobe Inc., San Jose, CA (US)

(72) Inventor: Russell Stringham, Orem, UT (US)

(73) Assignee: ADOBE INC., San Jose, CA (US)

( * ) Notice: Subject to any disclaimer, the term of this patent is extended or adjusted under 35 U.S.C. 154(b) by 317 days.

(21) Appl. No.: 15/943,372

(22) Filed: Apr. 2, 2018

(65) Prior Publication Data

US 2019/0303453 A1 Oct. 3, 2019

(51) Int. Cl.
*G06F 16/00* (2019.01)
*G06F 16/17* (2019.01)
*H04L 29/08* (2006.01)
*G06F 16/23* (2019.01)
*G06F 16/2455* (2019.01)

(52) U.S. Cl.
CPC ...... *G06F 16/1734* (2019.01); *G06F 16/2358* (2019.01); *G06F 16/2455* (2019.01); *H04L 67/22* (2013.01)

(58) Field of Classification Search
CPC .............................. G06F 11/3476; G06F 17/40
See application file for complete search history.

(56) References Cited

U.S. PATENT DOCUMENTS

| | | | |
|---|---|---|---|
| 2010/0088354 A1* | 4/2010 | Wu | G06F 11/3409 707/827 |
| 2015/0213288 A1* | 7/2015 | Bilodeau | G06F 21/6245 726/26 |

\* cited by examiner

*Primary Examiner* — Hung Q Pham
(74) *Attorney, Agent, or Firm* — Kilpatrick Townsend & Stockton LLP

(57) ABSTRACT

Disclosed systems and methods store interaction data by user and date. A computing device receives a unique visitor interaction data representing a first interaction between an entity and a visitor. The computing device accesses a list of file set identifiers. Each file set identifier corresponds to a respective set of users grouped together into a file set. The computing device computes a target file set identifier and matches the target file set identifier to a file set identifier from the list that identifies a file set that stores user interaction data for the entity. The computing device routes the first visitor interaction data to the identified file set. The computing device stores the first visitor interaction data and the second visitor interaction data sorted according to the first timestamp and the second timestamp.

20 Claims, 6 Drawing Sheets

US 10,769,110 B2

FACILITATING QUERIES FOR INTERACTION DATA WITH VISITOR-INDEXED DATA OBJECTS

TECHNICAL FIELD

This disclosure relates generally to computerized processing systems and methods for creating and modifying data structures and thereby facilitating the retrieval of stored records from data sources. More specifically, but not by way of limitation, this disclosure relates to storing transactions as visitor-indexed data objects.

BACKGROUND

Computing systems that host online services, such as web servers, create and modify data structures for logging user visits and other interactions with online services. These interactions can be logged for various reasons, including data security and content customization. To do so, web servers store log files that include the events or transactions performed on a website. A log file typically includes information such as a visitor identification number and the time the visitor navigated to a particular site. Such log files are typically organized by date of transaction and split into multiple files when the files inevitably grow too large.

Data queries for interaction data objects are used to identify and analyze sources of electronic interactions with websites and other online services. For example, a website operator may query a server to search for a set of transactions associated with one website user. But traditional logging methods make satisfying queries computationally expensive and data-intensive.

For instance, log files typically consist of a time-indexed list of interaction data objects from a set of user devices, where the objects identifying user device interactions are organized according to a data and time of the interaction. This sequential nature of the logging, coupled with the fact that a user's visits to the website are likely spaced by hours or even days or weeks, greatly reduces the likelihood that two data objects describing two user interactions from the same user are in the same file. Furthermore, the size of such log files, which could include every historical transaction with a website or other online service, can be enormous, often petabytes of data. Additionally, log files are inevitably split at arbitrary points, into multiple files, requiring additional computing resources. Because millions of users can visit a website in one day, the complete data set, which is not organized by user, is spread across potentially hundreds or thousands of files.

These deficiencies result in slower search times when servicing queries about particular users. For example, when searching for interaction data about one user, a full scan of millions of records in many files could be required, since a low probability exists that a given user's interactions are stored sequentially in a file that stores interaction data for millions of users sequentially. These scattered files can have sizes in the order of terabytes ($10^{12}$ bytes) or petabytes ($10^{15}$ bytes). Consequently, a search for a particular user's data requires devoting processing resources to searching these large files across many different storage nodes.

Accordingly, solutions are needed to more efficiently store and access user interaction data objects.

SUMMARY

Systems and methods are disclosed herein for storing interaction data by user and date. In an example, a computing device receives a first unique visitor interaction data representing a first interaction between an entity and a visitor and a second unique visitor interaction data representing a second interaction between an entity and the visitor. The first unique visitor interaction data includes a user identifier and a first timestamp and the second unique visitor interaction data includes the user identifier and a second timestamp that is later than the first timestamp. The computing device accesses a list of file set identifiers. Each file set identifier corresponds to a respective set of users grouped together into a file set. The computing device computes a target file set identifier by applying a file set identification function to the user identifier. The computing device matches the target file set identifier to a file set identifier from the list that identifies a file set that stores user interaction data for the entity. The computing device routes the first visitor interaction data and the second visitor interaction data to the identified file set. The computing device stores the first visitor interaction data and the second visitor interaction data sorted according to the first timestamp and the second timestamp.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
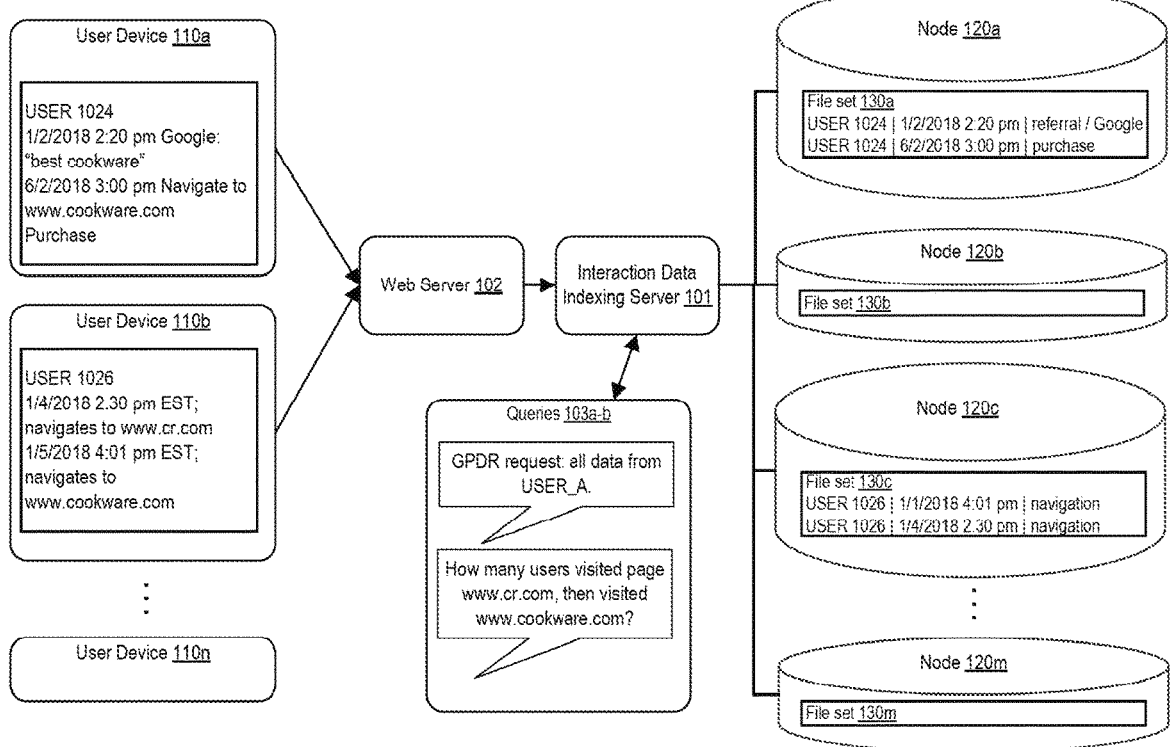
FIG. 1 depicts an example of an interaction data indexing system, according to certain embodiments of the present disclosure.

Embodiments described herein facilitate computationally efficient queries for interaction data objects by storing and organizing this data in visitor-indexed file sets. In contrast to traditional solutions that organize visitor interaction data objects based on the times at which interactions with online services occur, an interaction data indexing system described herein organizes interaction data objects stored in file sets based on a visitor entity that is the source of the interaction data object. For instance, rather than storing five data objects describing five interactions from the same visitor in a fragmented, non-sequential manner across different files, the interaction data indexing system organizes these five data objects by a value that is unique to a user (e.g., cookie identifier, email address, login username, etc.) and thereby stores the five data objects together in a common file set. Thus, a query for an interaction data object about this visitor requires searching a smaller number of files, thereby increasing the efficiency and speed at which the query is serviced.

In an example, a file set identification application executing on an interaction data indexing server receives a user interaction that indicates a visit to a website by a user device. The interaction includes a cookie and a timestamp. For example, a user device navigates to the website for a first time and the device's browser downloads a cookie with an identifier. The file set identification application also receives an object representing the user interaction.

Continuing with this example, the file set identification application performs various data-indexing processes to locate an appropriate data structure to store the received interaction data for efficient retrieval via subsequent queries. For instance, the file set identification application accesses a list of file set identifiers. Each file set identifier corresponds to a group of users for which interaction data is stored in the same file set. A file set is determined from a user identifier by using a file set identification function. As explained herein, different file set identification functions are possible, such as grouping by range of user identifiers to a particular file set or grouping users according to a remainder of a division of the user identifier with a common divisor.

For example, a file identification function that is based on ranges segregates interaction data from user identifiers 0-999 into a first file set, 1000-1999 into a second file set, and so on. The file set identification application routes the interaction data to the identified file set. The file set identification application accesses the file set identifier that has been identified via the mapping and stores the interaction in a visitor-indexed data object in the selected file set. The file identification function uniquely identifies the file set that corresponds to the user identifier and removes the need for the file set identification application to analyze multiple files or file sets to determine the correct location.

The user identifiers are typically distributed as evenly as possible across file sets. Should the number of user identifiers per file set or the amount of data stored per file set become imbalanced, the file set identification application can rebalance the distribution of identifiers to file sets.

In this example, the file set identification application processes subsequent user interactions from the same user device (or other user devices associated with the same entity) in the same manner by routing interaction data objects to the file set corresponding to the target entity associated with that user device. For example, if the same user device performs an additional interaction with respect to the website, the file set identification application routes an additional interaction data object to the same file set for the entity associate with the user device. The file set identification application groups the additional user interaction data object together with the first user interaction data object in a visitor-indexed data object. In one example, the file set identification application organizes the two interaction data objects in ascending or descending order according to time within a file set, such that interaction objects for a particular visitor or other entity are grouped together and sorted by timestamp within the group.

Certain embodiments improve data storage systems by facilitating rapid retrieval of data objects related to a particular entity. For instance, by storing user interactions in a visitor-indexed object, the file set identification application allows for servicing a query for a user interaction data object within n records via a search operation having a complexity of O log (n), because accessing data for a particular user simply requires determining an index rather than parsing through n records. By contrast, existing solutions for servicing the same query involve search operations having a larger complexity of O(n). Additionally or alternatively, storing interaction data objects in a group for a particular visitor or other entity reduces the need to consolidate, during a search operation, multiple interaction data objects spread across multiple files or nodes, as required by existing solutions. Consequently, using visitor-indexed objects, computation times of hours required by using existing data storage solution can be reduced to minutes or seconds using certain embodiments described herein.

As used herein, the term "interaction data" refers to electronic data that is automatically generated by a set of electronic communications in which a user device performs one or more operations with an online service, such as a website, via a data network. In some embodiments, interaction data describes or otherwise indicates one or more attributes of interactions by user devices with different sets of online content. For example, the interaction data could include records with one or more fields that describe an interaction. Examples of these fields include a timestamp of an interaction, a description of an interaction (e.g., a click, a selection of a navigation command for video or slideshow, a selection of text content, etc.), a location of the interaction within a webpage, an identifier of a particular content item (e.g., an address of webpage, an identifier of a video content or text content within the same webpage, etc.), or any other suitable data that describes or otherwise indicates how a user device has interacted with a given content item. Interaction data can also include whether a particular advertisement has been displayed on a particular user device. Interaction data can also be interactions with a mobile application.

As used herein, the term "interaction data object" refers to a record in an electronic data structure that includes interaction data. Examples of an electronic data structure include a communication formatted for transmission via a data network, a database hosted by a storage node, etc.

As used herein, the term a "timestamp" refers to an identifier that includes a time at which an interaction with a computing device occurred. For example, a timestamp could be the time at which a user device navigated to a particular website.

As used herein, the term "visitor" refers to an entity that interacts with a computing service such as a website or email provider.

Referring now to the drawings, FIG. 1 depicts an example of an interaction data indexing system 100, according to certain embodiments of the present disclosure. Interaction data indexing system 100 includes interaction data indexing server 101, nodes 120*a-m*, file sets 130*a-m*, queries 103*a-b*, web server 102, and user devices 110*a-n*. As described further herein, interaction data indexing server 101 receives user interactions from web server 102 and stores the user interactions in visitor-indexed objects according to user and date within one or more file sets 130*a-m* within nodes 120*a-m*.

For illustrative purposes, various embodiments are described using cluster nodes such as nodes 120*a-m*, but any suitable data structure (e.g., remote file storage, storage on a particular server or cluster node, unstructured storage such as Microsoft® Azure® Blob etc.) can be used. As such cluster nodes are optional. File sets 130*a-m* can therefore be stored in different types of storage. For example, interaction data indexing server 101 can store data for a particular user in one file set of file sets 130a-m that consists of one file or multiple files. In addition, a node 120a-m can have one or more file sets 130a-m. Nodes 120a-m receive data from interaction data indexing server 101 and store the data as directed by interaction data indexing server 101.

Interaction data indexing system 100 can include any number of user devices 110a-n. Examples of user devices 110a-n are computing devices such as desktop computers, laptop computers, tablets, smart phones, etc. A user operating one of user devices 110a-n can interact with a remote service in some manner. For example, user device 110a can operate web browser such as Internet Explorer®, Safari®, Chrome®, etc. to access a website such as a website hosted on web server 102. User devices 110a-n can be a chat, messaging, or email client. Further, in an embodiment, if a user device 110a-n is offline, e.g., in airplane mode when user interactions occur, the interactions can be held on the device and sent in the next time the app runs when the device is online, which may be days or months later. In such a case, the timestamps may be for the time the interactions occurred rather than the time that the user interactions arrived on a server device.

Each user device 110a-n can interact with web server 102 and thereby cause a user interaction to be logged as a user interaction object. Each user interaction includes an identifier and a time stamp. The identifier uniquely identifies the visitor, i.e., the user of a device of user devices 110a-n. The identifier is an identifying piece of data such as a web cookie, device identifier, user identifier, etc.

For example, as depicted, user device 110a interacts twice with web server 102. User device 110a, operated by user with identifier 1024, navigates to a search website on 1/2/2018 at 2.20 pm and enters the keyword string "best cookware." Later, on 6/2/2018 at 3.00 pm, user device 110b, operated by user with identifier 1026, navigates to the website "www.cookware.com" and completes a purchase. Because the user device 110b searched for a product "cookware" then navigated to a related site, these two user interactions represent related visits. As discussed further, such a relationship can be referred to as an attribution.

As can be seen, user device 110b sends two interactions to web server 102. First, on 1/4/2018 at 2.30 pm, user device 110b navigates to www.cr.com. The next day, 1/5/2018 at 4.01 pm, user device 110b navigates to www.cookware.com, but does not complete a purchase.

Web server 102 logs user interactions from devices such as user devices 110a-n. A web server is shown, but web server 102 can be any computing device that can log interactions, such as an email provider, or analytics server. Web server 102 receives user device interactions from user devices 110a and 110b as depicted and provides the queries to the interaction data indexing server 101. Web server 102 can also log the user interactions locally in an additional log file and send the interactions to interaction data indexing server 101 at a later time.

Interaction data indexing server 101 receives, from web server 102, interaction data objects that describe interactions between user devices 110a-n and web server 102. Interaction data indexing server 101 can process one interaction data object at a time or multiple interaction data objects at once depending on resource load. In an example, interaction data indexing server 101 receives an interaction data object corresponding to the first interaction caused user device 110a at web server 102. Interaction data indexing server 101 determines, for each interaction, the appropriate node from nodes 120a-m in which to store the interaction data object.

Interaction data indexing server 101 stores incoming user interaction data objects in one or more file sets 130a-m on one of nodes 120a-m according to user, then according to date. For example, interaction data indexing server 101 stores interaction data objects related to one user separately from interaction objects related to other users. The user interactions stored within a particular interaction data object are sorted by timestamp. For example, the interaction data objects for one user are ordered from oldest to newest, or newest to oldest.

Website cookies can be used as user identifiers. For example, a user device 110a-n interacting with a website may have downloaded a web cookie that has a unique identifier. Interaction data indexing server 101 can also use other unique identifiers.

Based on an identifying characteristic such as a user identifier, interaction data indexing server 101 routes the user interaction data object to an appropriate node from nodes 120a-m. As explained further with respect to FIGS. 2 and 3, interaction data indexing server 101 determines the appropriate node by applying a file set identification function to a user identifier. Other methods are possible.

Knowledge of related user interactions is valuable such as for attribution purposes or to satisfy a legal requirement. In the depicted example, interaction data indexing server 101 stores the two interactions, which are six months apart, in the same file set 130a. Interaction data indexing server 101 thereby facilitates easy access to the interactions in the future. Transactions that are far apart may be stored in different files within a file set, where the different files correspond to different time periods. Different files in the file set can represent different length time periods. For example, a time period in which a lot of user activity for a particular user is generated may be stored in more than one file. In contrast, existing solutions write such interactions to log files based on a timestamp. In such a system, the two interactions received from user device 110a would almost certainly not have been stored in the same file or node, requiring the duplication of a large amount of data and orders of magnitude more search time to satisfy a query.

In an embodiment, newly arriving data for multiple users may be written sequentially in a temporary file. In this embodiment, the interaction data indexing server 101 can periodically re-write the user interaction objects, sorting by user identifier and merge the temporary file into the file sets 130a-m. Such rewriting can occur after a specified time period with little or no activity.

File sets 130a-m, which can be located nodes 120a-m, store user interaction data objects as directed by interaction data indexing server 101. Nodes 120a-m can be network storage systems or distributed computing systems. Nodes 120a-m can use local storage, network attached storage, or any other suitable storage. For example, nodes 120a-m can be nodes running Apache™ Hadoop® or Apache™ Spark®. A file set corresponding to a particular user identifier is stored on one node of a cluster such as Hadoop® or Spark®. Nodes 120a-m can comprise Apache™ Parquet files or files that are compatible with Apache™ Parquet files. File sets 130a-m can be stored in blob storage, thereby not being associated with a particular node.

Nodes 120a-m and file sets 130a-m can be configured to provide row access or column access to the user interaction data object. For example, a node 120a-m stores file set 130a, which contains two user interactions, each with three entries such as user identifier, protocol type such as website visit, and timestamp. Node access refers to a sequential read that accesses a set of the entries of the first user interaction or a set of the entries of the second user interaction. In contrast, a column access refers to a sequential read of the same entry for multiple interactions, e.g., accessing the timestamp of the first entry and the timestamp of the second entry.

Interaction data indexing server 101 can receive and service queries from external devices. Examples of queries include a request for a set of the records from one user or how many users visited a certain page. Additionally, requests may include deleting data. For example, node 120*c* can easily delete the block of data, i.e., the interaction data objects, that correspond to a set of the user interactions attributable to user with identifier 1026, i.e., from user device 110*b*, because the interactions data objects are stored in one visitor-indexed data object. Interaction data indexing server 101 does not typically need to access a second node. For example, if interaction data indexing server 101 receives a request to delete the information attributable to user with identifier 1026, the interaction data indexing server 101 simply sends a request to node 120*c*, which performs the deletion.

For example, interaction data indexing server 101 receives queries 103*a*-*b*. As depicted, queries 103 can include the data attributable to user with identifier 1024. In which case, the interaction data indexing server 101 calculates the node from nodes 120*a*-*n* on which the data for user with identifier 1024 is stored, accesses the data, and returns the interaction data. Interaction data indexing server 101 determines that the interactions of user with identifier 1024 are stored in an interaction data object on node 120*a*. Interaction data indexing server 101 accesses node 120*a* and retrieves user interactions sequentially according to the respective timestamps. Storage in this manner allows sequential read access and reduces the need for non-contiguous access to a file or memory.

Figure 2:
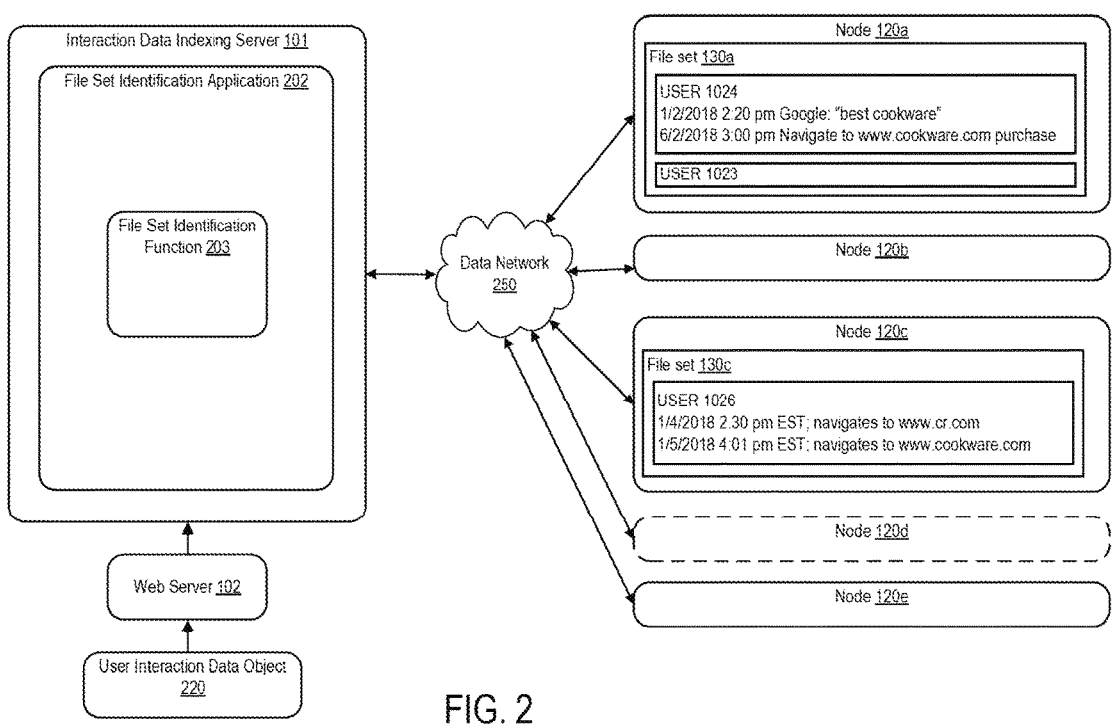
FIG. 2 depicts an example of a data flow of an interaction data indexing system, according to certain embodiments of the present disclosure.

FIG. 2 depicts an example of a data flow of an interaction data indexing system, according to certain embodiments of the present disclosure. Data flow 200 depicts interaction data indexing server 101, user interaction data object 220, web server 102, node 120*a*, node 120*b*, node 120*c*, node 120*e*, file sets 130*a*-*m*, and data network 250. Interaction data indexing server 101 connects, via data network 250, to nodes 120*a*, 120*b*, 120*c*, and 120*e*. User interaction data object 220 can be any user interaction data object such as a visit to a website, an email, or a message. Data network 250 can be a network such as a wired or wireless network, connected via Ethernet, fiber, or another connection. Data network 250 can be a public or private network.

Interaction data indexing server 101 includes a file set identification application 202 and file set identification function 203. File set identification function 203 can implement various different methods of mapping user interaction data objects to file sets. The file set identification function 203 can change, based on server uptime, total amount of storage required, or some other metric. As described further herein, in the case that one of the file sets 130*a*-*m* becomes over-burdened or full, interaction data indexing server 101 can assign a new file set and split the data from the burdened file set across two nodes. As depicted in FIG. 2, nodes 120*a*, 120*b*, 120*c*, and 120*e* are available. As indicated by dashed lines in FIG. 2, node 120*d* is offline. Accordingly, in the example depicted, four file sets are available.

As discussed, in some embodiments, file set identification function 203 can determine the mapping of a user interaction data object 220 for a particular user identifier by determining whether the associated user identifier falls within a range of values. For example, user identifiers 1023-1024 can map to file set 130*a*, and user identifiers 1026-1027 can map to node 120*c*.

In an example, interaction data indexing server 101 receives user interaction data object 220, which includes the data entry "USER 1026: 1/4/2018 2.30 pm EST; navigates to www.cr.com." Interaction data indexing server 101 provides the identifier 1026 to file set identification application 202. File set identification application 202 determines that the user interaction data from user identifiers 1026-1027 should be routed to file set 130*c*, which is on node 120*c*.

In other embodiments, file set identification function 203 determines an appropriate file set 130*a*-*m* for user interaction data object 220 attributed to a particular user by dividing the user identifier such as a cookie identifier, with a file identification variable. The file set identification variable represents the total number of available file sets 130*a*-*m*. The file set identification function 203 maps a user identifier to a file set identifier by computing a remainder, or modulus of a division of the user identifier by the file identification variable. For example, if a division of a user identifier by the file identification variable leaves remainder 0, then user interaction data for the user identifier maps to file set 130*a* (number 0). In this manner, the file identification function groups user interaction data objects 220*a*-*n* into sets of user data, or visitor sets. Each set represents a range of users.

Figure 3:
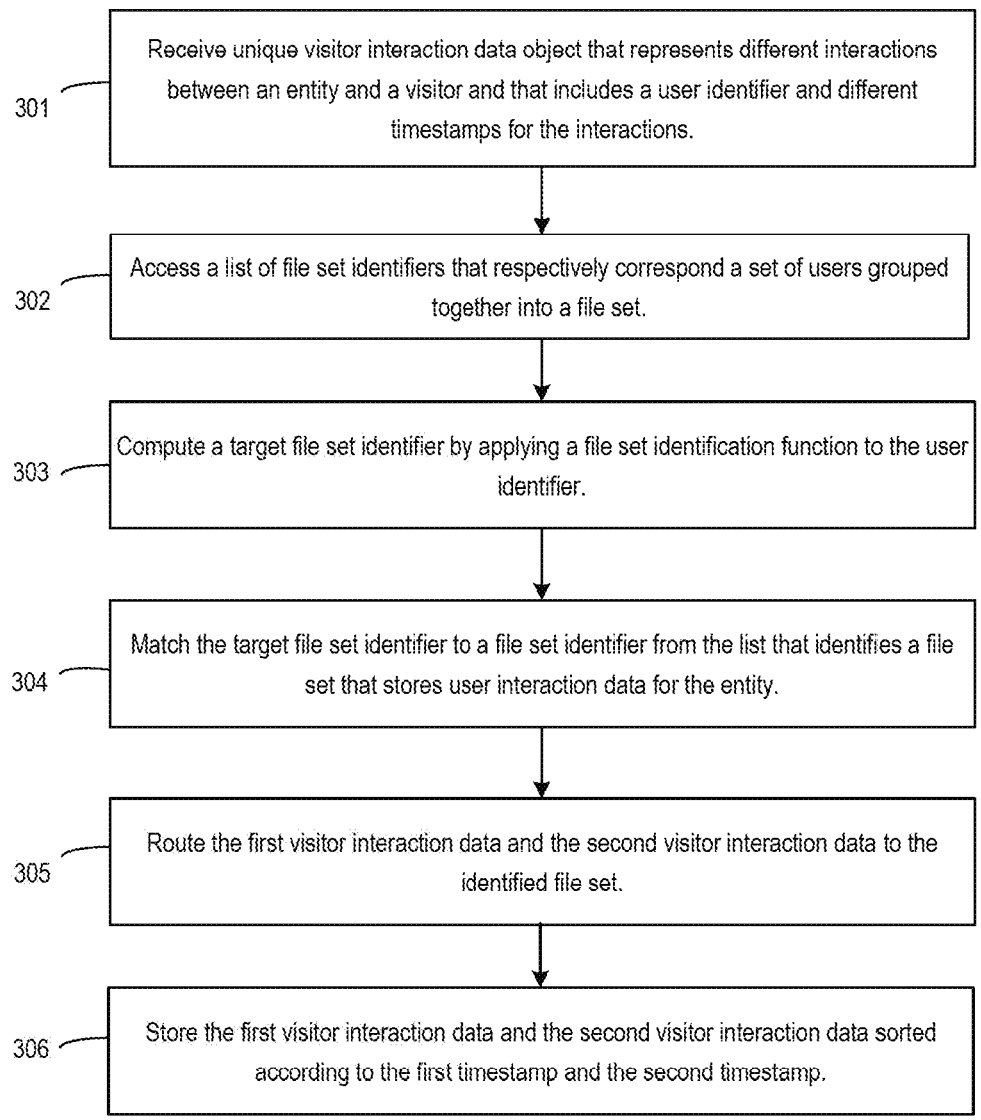
FIG. 3 depicts an example of a method for storing interaction data object by user and date, according to certain embodiments of the present disclosure.

FIG. 3 depicts an example of a method for storing interaction data object by user and date, according to certain embodiments of the present disclosure. Method 300 is described with respect to the interaction data indexing system 100 of FIG. 1 and the data flow depicted in FIG. 2 for illustration purposes, but other computing systems can implement method 300.

At block 301, method 300 involves receiving unique visitor interaction data object that represents different interactions between an entity and a visitor and that includes a user identifier and different timestamps for the interactions. For example, as depicted in FIG. 1, the interaction data indexing server 101 receives, from user device 110*a* via web server 102, a first interaction data object "USER 1024 1/2/2018 2:20 pm Google: 'best cookware.'" Later, interaction data indexing server 101 receives, from user device 110*b* via web server 102, a second user interaction object "6/2/2018 3:00 pm navigate to www.cookware.com; purchase" to web server 102. Web server 102 forwards the user interactions to interaction data indexing server 101.

At block 302, method 300 involves accessing a list of file set identifiers that respectively correspond a set of users grouped together into a file set. For example, file set identification application 202 accesses a list of file set identifiers that includes an identifier for file set 130*a*, and an identifier for file set 130*c*. The file set identifiers represent the file sets that are used for storage of user interaction data object.

At block 303, method 300 involves computing a target file set identifier by applying a file set identification function to the user identifier. As discussed, different methods may be used to distribute user interaction data across file sets. For example, a remainder method may be used in which the file set identification application 202 computes a remainder by dividing the user identifier by a file-identification variable. For example, file set identification application 202 divides the identifier 1024 by a file identification variable, which in this case is four. The result of the division of 1024 and four is 256, remainder zero.

At block 304, method 300 involves matching the target file set identifier to a file set identifier from the list that identifies a file set that stores user interaction data for the entity. Continuing the above example, the file set identification application 202 determines that the file set 130a (i.e., node "0"), corresponds to file set identifier "0."

At block 305, method 300 involves routing the first visitor interaction data and the second visitor interaction data to the identified file set. File set identification application 202 routes the user interaction data objects to file set 130a.

At block 306, method 300 involves storing the first visitor interaction data and the second visitor interaction data sorted according to the first timestamp and the second timestamp. Interaction data indexing server 101 routes, via data network 250, the first and second interactions of user with identifier 1024 to file set 130a (i.e., node "0"). File set 130a receives the first and second database objects, storing the objects according to timestamp.

For example, file set 130a sorts the first and second visitor interaction data objects according to increasing timestamp. Therefore, the database node stores the second unique visitor interaction data object subsequent to the first unique visitor interaction data object. Alternatively, file set 130b can sort the data objects according to decreasing timestamp, e.g., the second data object before the first data object.

Figure 5:
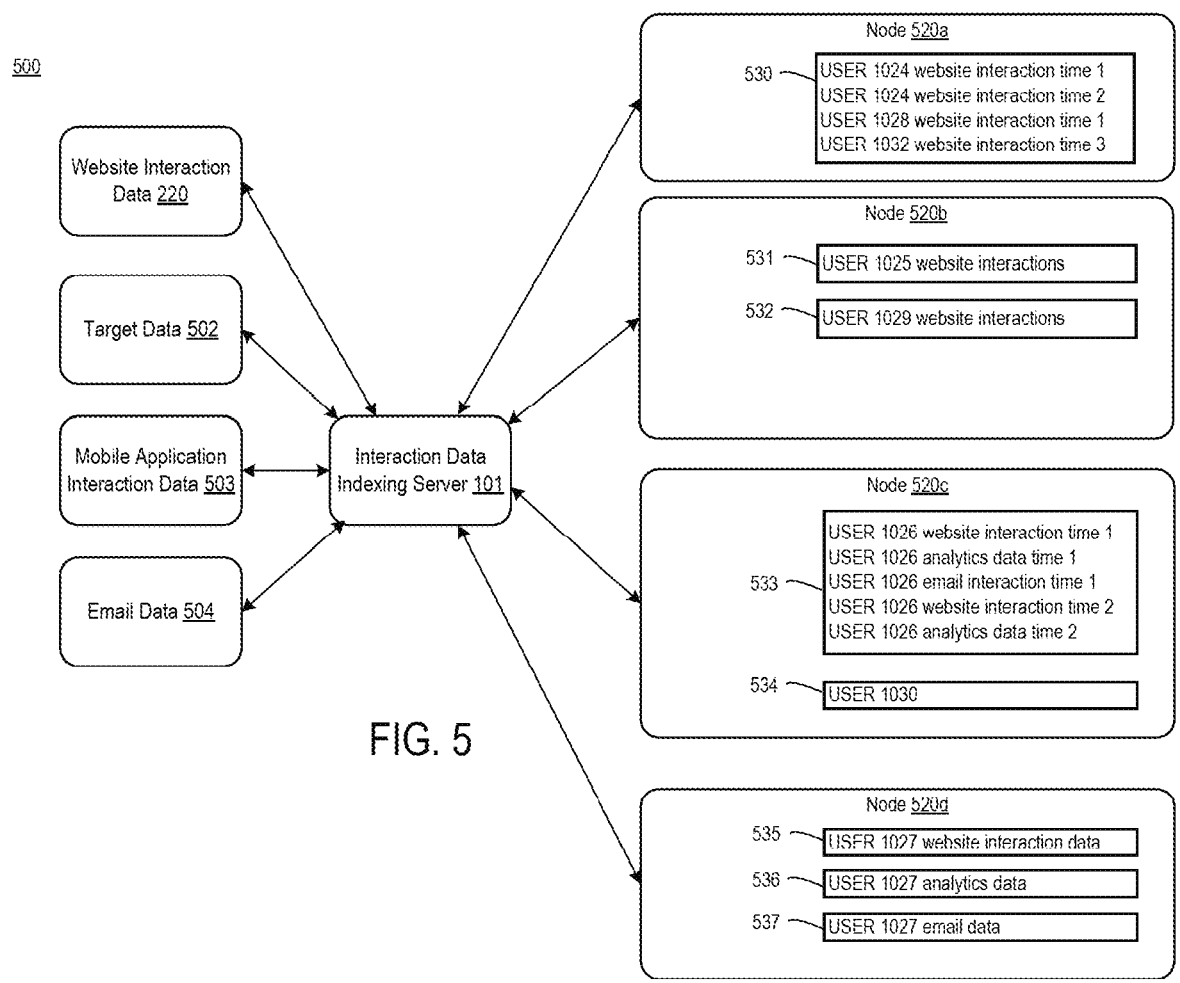
FIG. 5 depicts different data sources and storage approaches used by interaction data indexing server, according to certain embodiments of the present disclosure.

As discussed further with respect to FIG. 5, interaction data indexing server 101 and file set identification application 202 can also process interaction data objects from different sources such as analytics data or from emails. File set identification application 202 can store interaction objects from different sources in different file sets or visitor-indexed data objects. File set identification application 202 can also store interaction data objects from different sources in the same file.

Interaction data indexing server 101, running file set identification application 202, can also service queries for user data based on a particular user identifier. For example, in order to service a European Union's General Data Protection Regulation (GDPR) request, an external device provides a user identifier such as a cookie to file set identification application 202. File set identification application 202 processes the query and obtains a set of user interaction data based on the user identifier from the nodes 120a-m.

Figure 4:
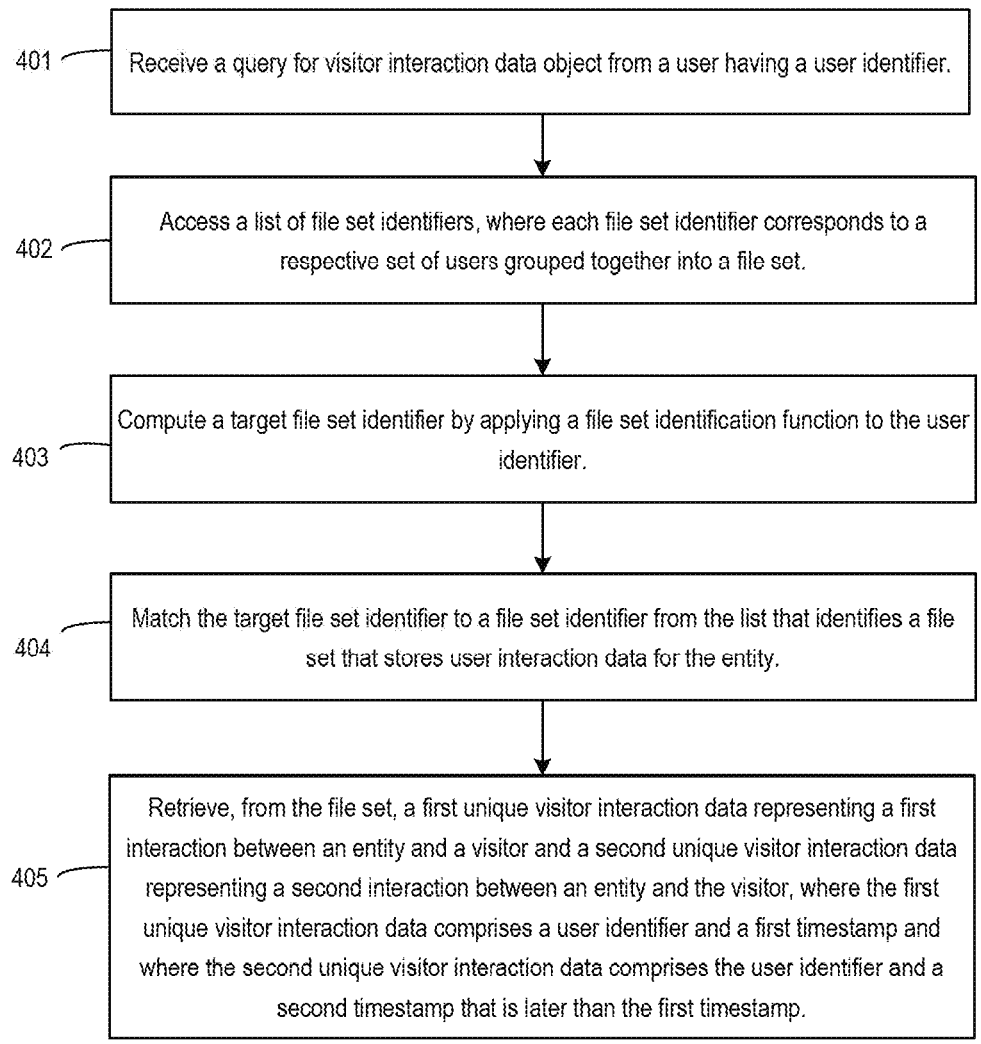
FIG. 4 depicts an example of a method for retrieving a user interaction data object that is stored by user and date, according to certain embodiments of the present disclosure.

FIG. 4 depicts an example of a method for retrieving a user interaction data object that is stored by user and date, according to certain embodiments of the present disclosure. Method 400 is described with respect to the interaction data indexing system 100 of FIG. 1 and the data flow depicted in FIG. 2 for illustration purposes. Other computing systems can implement method 400. Method 400 can be used to service queries such as a request for a set of the data from a particular user.

At block 401, method 400 involves receiving a query for visitor interaction data object from a user having a user identifier. For example, file set identification application 202 receives a request for a set of the user interaction data object attributable to user with identifier 1026.

At block 402, method 400 involves accessing a list of file set identifiers, where each file set identifier corresponds to a respective set of users grouped together into a file set. At block 302, file set identification application 202 accesses a list of file set identifiers generally as described with respect to block 302.

At block 403, method 400 involves computing a target file set identifier by applying a file set identification function to the user identifier. At block 403, file set identification application 202 accesses a list of file set identifiers generally as described with respect to block 303.

At block 404, method 400 involves matching the target file set identifier to a file set identifier from the list that identifies a file set that stores user interaction data for the entity. At block 404, file set identification application 202 accesses a list of file set identifiers generally as described with respect to block 304.

At block 405, method 400 involves retrieving, from the file set, a first unique visitor interaction data representing a first interaction between an entity and a visitor and a second unique visitor interaction data representing a second interaction between an entity and the visitor, where the first unique visitor interaction data comprises a user identifier and a first timestamp and where the second unique visitor interaction data comprises the user identifier and a second timestamp that is later than the first timestamp. For example, file set identification application 202 determines that two interaction data objects are attributable to identifier 1026. Each interaction data object is unique and includes a timestamp along with the identifier 1026. In an example, the second user interaction data object has a timestamp that is later than the timestamp on the first user interaction data object. Accordingly, file set identification application 202 first retrieves the first user data interaction object, then retrieves the second user data interaction object and provides the two user interactions to file set identification application 202.

Node 120c and file set identification application 202 can also access interaction data objects in column fashion, as further discussed herein. For example, node 120c can provide the type of data of the first interaction data object and a type of data of the second interaction data object to file set identification application 202.

FIG. 5 depicts different data sources and storage approaches used by interaction data indexing server 101, according to certain embodiments of the present disclosure. Interaction data indexing server 101 can aggregate data from different sources in addition to website interaction data objects as described with respect to FIGS. 1-4. Further, interaction data indexing server 101 can store received user interaction data objects and other data in different manners.

For instance, FIG. 5 depicts indexing system 500. Indexing system 500 includes user interaction data object 220, target data 502, mobile application interaction data 503, email data 504, interaction data indexing server 101, and nodes 520a-d. Various data such as user interaction data object 220, target data 502, mobile application interaction data 503, and email data 504 provide user interaction data object to interaction data indexing server 101. In turn, interaction data indexing server 101 stores user interaction data objects in nodes 520a-d. Node 520a includes file set 530. Node 520b includes file sets 531 and 532. Node 520c includes file sets 533 and 534. Node 520d includes file sets 535, 536, and 537.

FIG. 5 also depicts various examples of interaction sources and arrangements of user interaction data objects. Methods 300 and 400 can also receive data from these sources and organize data according to the depictions in indexing system 500.

Indexing system 500 further illustrates how interaction data indexing server 101, in conjunction with file set identification application 202, can allocate interaction data objects from different users to different nodes such as nodes 520a-d. As depicted, visitor interaction server 101 has allocated users with identifiers 1024, 1028, and 1032 to node 520a, users with identifiers 1025 and 1029 to node 520b, users with identifiers 1026 and 1030 to node 520c, and users with identifier 1027 to node 520d. As can be seen, the allocation of users operates on a remainder, or modulus-based scheme as described with respect to FIGS. 1-3. Other mapping schemes are possible.

Interaction data indexing server 101 can organize or cause nodes 520*a-d* to organize interaction data from different sources in different ways. For example, as shown by node 520*a*, interaction data indexing server 101 has organized the user interaction data into one file set. More specifically, the user interaction data object is organized by user then by date. As can be seen, user with identifier 1024's first interaction at time 1 is shown, followed by user with identifier 1024's second interaction at time 2. User with identifier 1028's only interaction at time 1 is next, followed by user with identifier 1032's only interaction at time 3.

In contrast, as depicted by node 520*b*, interaction data indexing server 101 has organized user interaction data object from different users into file sets 531 and 532. For example, the interaction data object from user 1025 is organized in file set 531 and the user interaction data object from user 1029 into file set 532.

Interaction data indexing server 101 can receive and aggregate different types of data. As discussed with respect to FIGS. 1-5, interaction data indexing server 101 can operate with website interaction data object such as user interaction data object 220. But interaction data indexing server can also process and target data 502, mobile application interaction data 503, email data 504, or other data that is attributable to a user. Target data 502 includes information about a particular user, or target. Examples of target data include targeted offers (ads) displayed to the user on a company's own website. Examples of mobile application interaction data 503 include a number of visits to a site by a particular user, or a frequency of visits by a particular user. Examples of email data 504 include information about advertising emails sent to a user and the user's response to those emails (opened, clicked on embedded link, etc.).

The combination of data from different data sources can be useful for attribution. Attribution refers to linking a user's actions to an event such as a purchase. For example, as depicted in FIG. 1, user with identifier 1024 navigates to the Google® search engine and enters the query "best cookware." Next, user with identifier 1026 navigates to www-.cookware.com, and makes a purchase. Having data organized by visitor, especially according to time, facilitates a simple attribution between two events.

Interaction data indexing server 101 can also combine multiple sources of data for a given user into one record or file set. This approach, sometimes called "hit stitching," involves combining data from multiple sources into one easily accessible record or file set. As depicted by node 520*c*, interaction data indexing server 101 has organized different types of data attributable to user with identifier 1026 into the same file set 533. File set 533 includes analytics data such as webpage statistics. Example webpage statistics are how long a page was viewed, how long a page was hidden, viewing duration for each ad, when a page is opened, and the scrolling that the user performed. As can be seen, file set 533 includes a website interaction data object consisting of two interactions, an email interaction, and two analytics data points. In an embodiment, the interaction, email, and analytics data for one user identifier are separated into different files. In this manner, a search for a particular kind of data or event requires only opening the corresponding file. Each file is organized by time, i.e., a set of data points for a certain time, then a set of data points for the next time, etc. In another embodiment, data for a given user can be stored user identifier and then by time without regard to data type.

As incoming data arrives from different sources, interaction data indexing server 101 can perform hit de-duplication, or reduction. De-duplication refers to the removal of redundant user interaction data objects, e.g., interaction data object that refers to the same interaction. User interaction reporting systems, which may be on different servers with different software, or even at different sites. Such systems can each report the same event, such as a user's navigation to a page. But in a file system where the data sources are combined, duplication of an event is undesirable. As such, interaction data indexing server 101 can detect and remove duplicate data points and user interactions. In an embodiment, rules can be created that dictate under what conditions such a reduction of duplicated data occurs.

In another embodiment, illustrated by node 520*d*, separate data types for a given user are maintained in separate file sets. This approach enables efficient reporting on only the types of data relevant to a given query or use case. As depicted by node 520*d*, website interaction data object for user 1027 is stored in file set 535, analytics data from user 1027 is stored in file set 536, and email data for user 1027 is stored in file set 537.

Further, interaction data indexing server 101 combines or separates file sets at a given node 520*a-d*, or between nodes 520*a-d*. For example, over time, more and more visitor user interactions are recorded on nodes 520*a-d*. When a particular node 520*a-d* is full, interaction data indexing server 101 can reallocate data between nodes 520*a-d* as necessary. Different methods can be used to split the user interaction data object.

Interaction data indexing server 101 provides efficiencies when handling requests for user interaction data from multiple visitors. For example, in an embodiment, user interaction data for two different visitors is stored in one file set. Within the file set, each data for a first visitor is stored separately from each data from a second visitor. The user interactions for the first visitor are organized sequentially by timestamp. The user interactions for the second visitor are organized sequentially by timestamp. In this manner, interaction data indexing server 101 can access data for the first visitor within a file sequentially without having to access interaction data for a different visitor.

In another embodiment, interaction data indexing server 101 processes multiple visitors by analyzing transactions for each visitor sequentially. More specifically, interaction data indexing server 101 can identify a sequence of two or more events that are related, such as an interaction with an online service followed by a transaction or sale. User interaction data service may look through all user interaction data for one user in order to identify instances in which a first event occurred, identify a specified time period and identify a second event. In this manner, because user interaction data is organized by user and then by timestamp, user interaction data indexing server 101 can perform queries for data from multiple visitors without unnecessarily copying large data files or analyzing data that is not relevant to the query.

In an example, the interaction data indexing server 101 receives an query identifying a first event type and a second event type that occurs in a sequence with the first event type. The interaction data indexing server 101 services the query by determining that the first unique visitor interaction data has the first event type and the second unique visitor interaction data has the second event type. The interaction data indexing server 101 retrieves the first unique visitor interaction data and the second unique visitor interaction data. The interaction data indexing server 101 adds the first unique visitor interaction data and the second unique visitor interaction data to results for the additional query.

Continuing the above example, in a second operation, the interaction data indexing server 101 accesses the file set that stores first additional unique visitor interaction data for an additional user and second additional unique visitor interaction data for the additional user. The file set can be the same file set as used to store the first unique visitor information and the second unique visitor information. The interaction data indexing server 101 determines that the first additional unique visitor interaction data has the first event type and the second additional unique visitor interaction data has the second event type, and retrieves the first additional unique visitor interaction data and the second unique additional visitor interaction data. The interaction data indexing server 101 adds the first additional unique visitor interaction data and the second additional unique visitor interaction data to the results for the additional query.

In a further embodiment, the data for a visitor spans multiple files within a file set. User interaction data for one visitor is accessed from across the multiple files before data from subsequent visitors is accessed in any of the files. In this manner, interaction data indexing server 101 does not need cache the path of a particular user interaction data while processing data from other visitors. Continuing the above example, the interaction data indexing server completes the first operation before the second operation.

Figure 6:
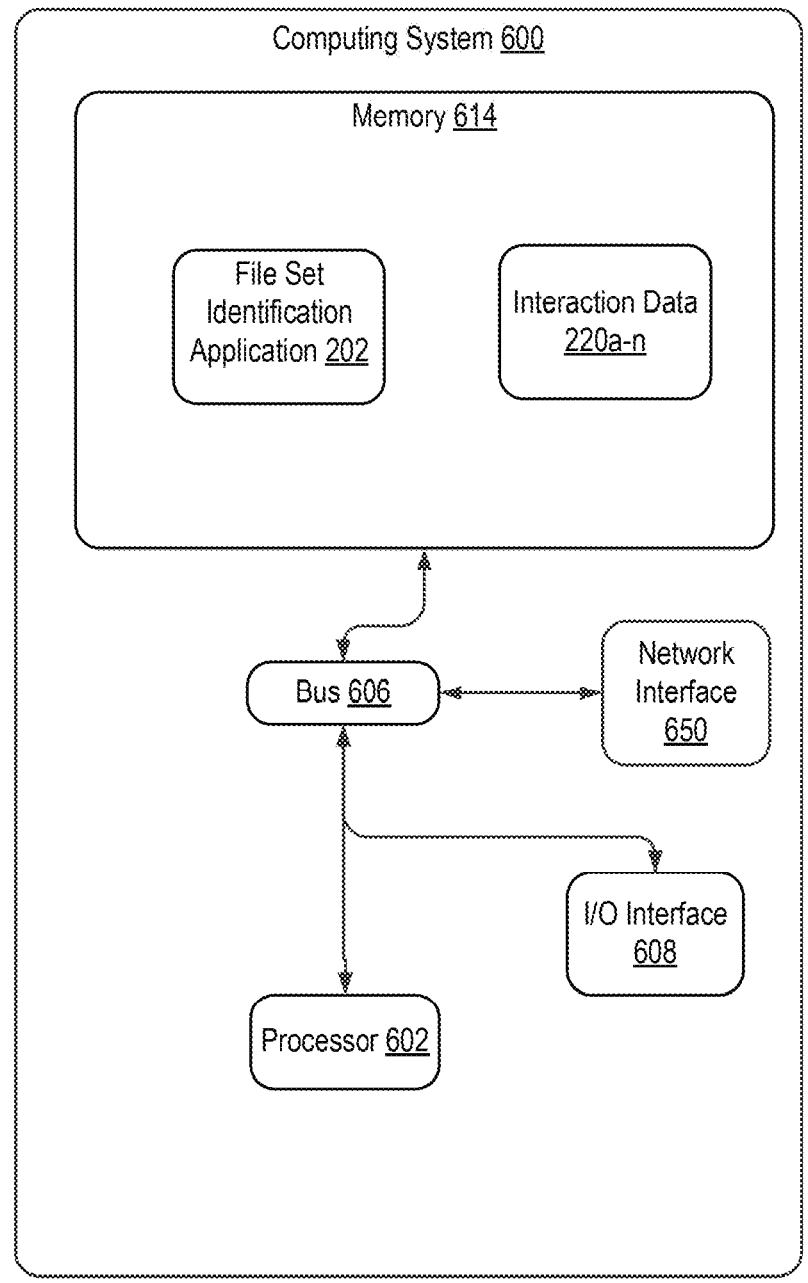
FIG. 6 depicts an example of a computing system for implementing certain embodiments of the present disclosure.

FIG. 6 depicts an example of a computing system 600 for implementing certain embodiments of the present disclosure. The computing system 600 includes one or more processors 602 communicatively coupled to one or more memory devices 614. The processor 602 executes computer-executable program code, which can be in the form of non-transitory computer-executable instructions, stored in the memory device 614, accesses information stored in the memory device 614, or both. Examples of the processor 602 include a microprocessor, an application-specific integrated circuit ("ASIC"), a field-programmable gate array ("FPGA"), or any other suitable processing device. The processor 602 can include any number of processing devices, including one.

The memory device 614 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices such as input or output devices. For example, the computing system 600 is shown with an input/output ("I/O") interface 608 that can receive input from input devices or provide output to output devices. A bus 606 can also be included in the computing system 600. The bus 606 can communicatively couple one or more components of the computing system 600 and allow for communication between such components.

The computing system 600 executes program code that configures the processor 602 to perform one or more of the operations described above with respect to FIGS. 1-5. The program code of the file set identification application 202, which can be in the form of non-transitory computer-executable instructions, can be resident in the memory device 614 or any suitable computer-readable medium and can be executed by the processor 602 or any other one or more suitable processor. Execution of such program code configures or causes the processor(s) to perform the operations described herein with respect to the processor 602. In additional or alternative embodiments, the program code described above can be stored in one or more memory devices accessible by the computing system 600 from a remote storage device via a data network. The processor 602 and any processes can use the memory device 614. The memory device 614 can store, for example, additional programs, or data used by the applications executing on the processor 602 such as the file set identification application 202.

The computing system 600 can also include at least one network interface 650. The network interface 650 includes any device or group of devices suitable for establishing a wired or wireless data connection to one or more data networks. Non-limiting examples of the network interface 650 include an Ethernet network adapter, WiFi network, a modem, and/or the like. The computing system 600 is able to communicate with one or more other computing devices or computer-readable data sources via a data network using the network interface 650.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

What is claimed is:

1. A method for storing interaction data by user and date, wherein the method includes performing, by one or more processing devices, operations comprising:
    receiving a first unique visitor interaction data representing a first interaction between an entity and a visitor and a second unique visitor interaction data representing a second interaction between the entity and the visitor, wherein the first unique visitor interaction data comprises a user identifier and a first timestamp and wherein the second unique visitor interaction data comprises the user identifier and a second timestamp that is later than the first timestamp;
    accessing a list of file set identifiers, wherein each file set identifier of the list of file set identifiers corresponds to a respective set of users grouped together into a file set;
    computing a target file set identifier by applying a file set identification function to the user identifier;
    matching the target file set identifier to a file set identifier from the list of file set identifiers, wherein the file set identifier identifies a file set that stores user interaction data for the entity;
    routing the first unique visitor interaction data and the second unique visitor interaction data to the identified file set; and
    storing, in the identified file set, the first unique visitor interaction data and the second unique visitor interaction data sorted according to the first timestamp and the second timestamp.

2. The method of claim 1, further comprising:
    determining that the first timestamp occurred with a first time range and that the second timestamp occurred within a second time range; and
    storing the first unique visitor interaction data in a first file within the identified file set and the second unique visitor interaction data in a second file within the identified file set.

3. The method of claim 1, further comprising:
    receiving a query for visitor interaction data from an additional user having an additional user identifier;
    accessing the list of file set identifiers;
    computing an additional target file set identifier by applying the file set identification function to the additional user identifier;
    matching the additional target file set identifier to an additional file set identifier from the list of file set identifiers, that wherein the additional file set identifier identifies an additional file set that stores user interaction data for the entity; and
    retrieving, from the additional file set, a first additional unique visitor interaction data representing a first additional interaction between the entity and an additional visitor and a second additional unique visitor interaction data representing a second additional interaction between the entity and the additional visitor, wherein the first additional unique visitor interaction data comprises the additional user identifier and a first additional timestamp and wherein the second additional unique visitor interaction data comprises the additional user identifier and a second additional timestamp that is later than the first additional timestamp.

4. The method of claim 1, further comprising:
    storing the first unique visitor interaction data and the second unique visitor interaction data in a first file;
    receiving, from a second data source, a third unique visitor interaction data representing a third interaction with the entity; and
    routing the third unique visitor interaction data to the identified file set and storing the third unique visitor interaction data in a second file of the identified file set.

5. The method of claim 4, wherein the second data source is one of (i) analytics data, (ii) email data, or (iii) user profile data.

6. The method of claim 1, wherein the first unique visitor interaction data and the second unique visitor interaction data each include a respective identifier, a protocol type, and a timestamp, the method further comprising storing the first unique visitor interaction data and the second unique visitor interaction data in the identified file set, wherein at least one file in the identified file set is organized to provide columnar access such that the respective identifier, the protocol type, or the timestamp can be jointly accessed.

7. The method of claim 6, wherein the identified file set comprises a parquet file.

8. The method of claim 1, wherein the identified file set is stored on a first node of a cluster, the method further comprising replicating the identified file set to an additional file set stored on an second node of the cluster by routing the first unique visitor interaction data and the second unique visitor interaction data to the additional file set and storing the first unique visitor interaction data and the second unique visitor interaction data sorted according to the first timestamp and the second timestamp in the additional file set.

9. The method of claim 1, wherein the identified file set is stored on a single node within either (i) an Apache Hadoop cluster or (ii) Apache Spark cluster.

10. A system comprising:
    a non-transitory computer-readable medium storing user interaction data and computer-executable instructions for storing interaction data by user and date; and
    a processing device communicatively coupled to the non-transitory computer-readable medium, wherein executing the computer-executable instructions configures the processing device to perform operations comprising:
        receiving a query for visitor interaction data from a user having a user identifier;
        accessing a list of file set identifiers, wherein each file set identifier corresponds to a respective set of users grouped together into a file set;
        computing a target file set identifier by applying a file set identification function to the user identifier;
        matching the target file set identifier to a file set identifier from the list of file set identifiers, wherein the file set identifier identifies a file set that stores user interaction data for the user;

identifying, from a plurality of file sets, a file set that stores user interaction data identified by the file set identifier; and retrieving, a first unique visitor interaction data representing a first interaction between an entity and a visitor and a second unique visitor interaction data representing a second interaction between the entity and the user, wherein the first unique visitor interaction data comprises the user identifier and a first timestamp and wherein the second unique visitor interaction data comprises the user identifier and a second timestamp that is later than the first timestamp.

11. The system of claim 10, wherein computing the target file set identifier comprises:

determining that the user identifier falls within a range of user identifiers associated with the target file set identifier; and selecting the target file set identifier from the list of file set identifiers.

12. The system of claim 10, further comprising:

determining that the first timestamp occurred with a first time range and that the second timestamp occurred within a second time range; and storing the first unique visitor interaction data in a first file within the identified file set and the second unique visitor interaction data in a second file within the identified file set.

13. The system of claim 10, wherein the identified file set is stored on a first node of a cluster, the operations further comprising replicating the identified file set to an additional file set stored on an second node of the cluster by routing the first unique visitor interaction data and the second unique visitor interaction data to the additional file set and storing the first unique visitor interaction data and the second unique visitor interaction data sorted according to the first timestamp and the second timestamp in the additional file set.

14. The system of claim 10, wherein the identified file set is stored on a single node within either (i) an Apache Hadoop cluster or (ii) Apache Spark cluster.

15. The system of claim 10, wherein the query further comprises additional visitor interaction data for an additional user having an additional user identifier, the operations further comprising:

computing an additional target file set identifier by applying the file set identification function to the additional user identifier;

determining that the additional target file set identifier is identical to the target file set identifier; and retrieving, from the file set, additional unique visitor interaction data representing interactions between the entity and the additional user, wherein the retrieving of the additional unique visitor interaction data is performed sequentially within the file set and without accessing the first or second unique visitor interaction data.

16. The system of claim 10, the operations further comprising:

receiving an additional query identifying a first event type and a second event type that occurs in a sequence with the first event type;

in a first operation for servicing the additional query:

determining that the first unique visitor interaction data has the first event type and the second unique visitor interaction data has the second event type, retrieving the first unique visitor interaction data and the second unique visitor interaction data, and adding the first unique visitor interaction data and the second unique visitor interaction data to results for the additional query; and in a second operation for servicing the additional query, wherein the file set stores a first additional unique visitor interaction data for an additional user and a second additional unique visitor interaction data for the additional user and wherein the second operation includes:

determining that the first additional unique visitor interaction data has the first event type and the second additional unique visitor interaction data has the second event type, and retrieving the first additional unique visitor interaction data and the second unique additional visitor interaction data, and adding the first additional unique visitor interaction data and the second additional unique visitor interaction data to the results for the additional query.

17. The system of claim 16, wherein the first operation for servicing the additional query includes accessing multiple files in the file set, and wherein the system is configured for completing the first operation prior to performing the second operation.

18. A non-transitory computer-readable storage medium storing computer-executable program instructions, wherein when executed by a processing device, the program instructions cause the processing device to perform operations comprising:

receiving a first unique visitor interaction data representing a first interaction between an entity and a visitor and a second unique visitor interaction data representing a second interaction between the entity and the visitor, wherein the first unique visitor interaction data comprises a user identifier and a first timestamp and wherein the second unique visitor interaction data comprises the user identifier and a second timestamp that is later than the first timestamp;

accessing a list of file set identifiers, wherein each file set identifier corresponds to a respective set of users grouped together into a file set;

computing a target file set identifier by applying a file set identification function to the user identifier;

matching the target file set identifier to a file set identifier from the list of file set identifiers that identifies a file set that stores user interaction data for the entity;

routing the first unique visitor interaction data and the second unique visitor interaction data to the identified file set; and storing the first unique visitor interaction data and the second unique visitor interaction data sorted according to the first timestamp and the second timestamp.

19. The computer-readable storage medium of claim 18, the operations further comprising:

receiving a query for visitor interaction data, wherein the query comprises the user identifier;

accessing the list of file set identifiers;

computing an additional target file set identifier by applying the file set identification function to the user identifier;

matching the additional target file set identifier to a file set identifier from the list of file set identifiers, wherein the additional target file set identifier identifies a file set that stores user interaction data for the entity; and retrieving, from the file set, the first unique visitor interaction data and a visitor and the second unique visitor interaction data.

20. The computer-readable storage medium of claim 18, the operations further comprising:
 storing the first unique visitor interaction data and the second unique visitor interaction data in a first file of the identified file set;
 receiving, from a second data source, a third unique visitor interaction data representing a third interaction with the entity; and
 routing the third unique visitor interaction data to the identified file set and storing the third unique visitor interaction data in a second file of the identified file set.

\* \* \* \* \*